United States Patent
Trainor

(12) 
(10) Patent No.: US 6,337,691 B1
(45) Date of Patent: Jan. 8, 2002

(54) IMAGE DATA TRANSFER

(75) Inventor: James Trainor, Quebec (CA)

(73) Assignee: Discreet Logic Inc., Quebec (CA)

( * ) Notice: Subject to any disclaimer, the term of this patent is extended or adjusted under 35 U.S.C. 154(b) by 0 days.

(21) Appl. No.: 09/126,039

(22) Filed: Jul. 29, 1998

(30) Foreign Application Priority Data

Jul. 29, 1997 (GB) .............................................. 9715925

(51) Int. Cl.$^7$ .............................................. G06F 13/00
(52) U.S. Cl. .......................... 345/537; 345/723; 725/87
(58) Field of Search ................................ 345/501–503, 345/516, 505, 511, 328, 536, 537, 547, 723; 725/38, 46, 87–89, 92

(56) References Cited

U.S. PATENT DOCUMENTS

| | | | |
|---|---|---|---|
| 5,808,628 A | * 9/1998 | Hinson et al. ............... | 345/507 |
| 5,818,542 A | * 10/1998 | Harnois ....................... | 348/594 |
| 5,974,503 A | * 10/1999 | Venkatesh et al. .......... | 711/114 |
| 6,029,194 A | * 2/2000 | Tilt ............................. | 709/219 |
| 6,092,154 A | * 7/2000 | Curtis et al. ................ | 711/137 |
| 6,269,394 B1 | * 7/2001 | Kenner et al. .............. | 709/217 |

FOREIGN PATENT DOCUMENTS

GB 2274223 A 7/1994

OTHER PUBLICATIONS

Chua, T. and Ruan L., "A Video Retrieval and Sequencing System", ACM Transactions on Information Systems, vol. 13, No. 4, Oct. 1995, pp. 373–407.*

Matthews, J., Gloor, P., and Makedon F., "VideoScheme: A Programmable Video Editing System for Automation and Media Recognition", Proceedings of the First ACM International Conference on Multimedia, 1993, pp. 4.*

Meng, J. and Chang, S., "CVEPS—A Compressed Video Editing and Parsing System", Proceedings of the Fourth ACM International Conference on Multimedia, 1996, pp. 43–53.*

* cited by examiner

Primary Examiner—Ulka J. Chauhan
(74) Attorney, Agent, or Firm—Gates & Cooper LLP

(57) ABSTRACT

Image data (derived from film or video clips) is transferred from storage to high speed memory. After a transfer has taken place, a prediction is made as to subsequent image frames that will need to be transferred. The predicted images are transferred from storage to high speed memory while previously transferred data held in memory is processed.

23 Claims, 14 Drawing Sheets

IMAGE DATA TRANSFER

FIELD OF THE INVENTION

The present invention relates to transferring image data for use by image processing systems.

BACKGROUND OF THE INVENTION

Video post production techniques are known in which digital signals representing images are manipulated in a process generally referred to as compositing. Video data is stored on magnetic tapes such as D1 broadcast quality component tape, transferred into a compositing environment, composited and edited etc., and then recorded back on to digital video tapes. As is known in the art, an advantage of transferring data digitally is that many repeated operations may take place or many layers of video may be combined. Ultimately, a final output tape is produced from which broadcastable material may be derived.

Such a compositing environment will typically be based on an image processing workstation running a compositing software application. A variety of such hardware and software applications are available having varying capabilities and prices. In general, the more expensive the hardware or software package, the greater its processing power. The lower power, less expensive workstations may not be able to process video data at a speed sufficient to provide real time previewing of the results of image compositing. This means that there is a delay between performing the compositing operation and viewing the outcome.

One possible solution would be to include routines within the compositing software application which attempt to provide real time previewing facilities. This, however, would require the application software to be re-written which is expensive in terms of design and implementation time. This would also require the users of the software application to purchase the new upgrade or a completely new software package.

SUMMARY OF THE INVENTION

According to a first aspect of the present invention, there is provided a method of transferring image data describing sequences of images representing a plurality of clips from a storage device to a high speed memory for image processing, comprising the steps of: predicting image data which will be required by said image processing step after processing image data currently in said high speed memory; and transferring said predicted image data from said storage device to said high speed memory while processing said current image data.

Preferably, the predicting step includes creating a look-ahead map having data describing said plurality of video clips; creating a history table of requested images; and searching for patterns in said look-ahead map and said history table to predict images which will be required by said image process. Preferably, the indications of said predicted images are stored in a prediction table and the data describing each image in said look-ahead table may comprise physical storage addresses on said storage device of the next image in a clip.

According to a second aspect of the present invention, there is provided image data transfer apparatus, comprising processing means including a processor executing one or more image processing applications, a high speed memory and a storage device, wherein said processor is arranged to transfer image data describing sequences of image representing a plurality of clips from said storage device to said high speed memory by predicting image data which will be required by said image processing applications after processing video data currently in said high speed memory; and transferring said predicted image data from said storage device to said high speed memory while processing said current image data.

In a preferred embodiment, the processor is arranged to perform the prediction and transferring of predicted image data each time image data is requested from said storage device.

DETAILED DESCRIPTION OF THE PREFERRED EMBODIMENT

Figure 1:
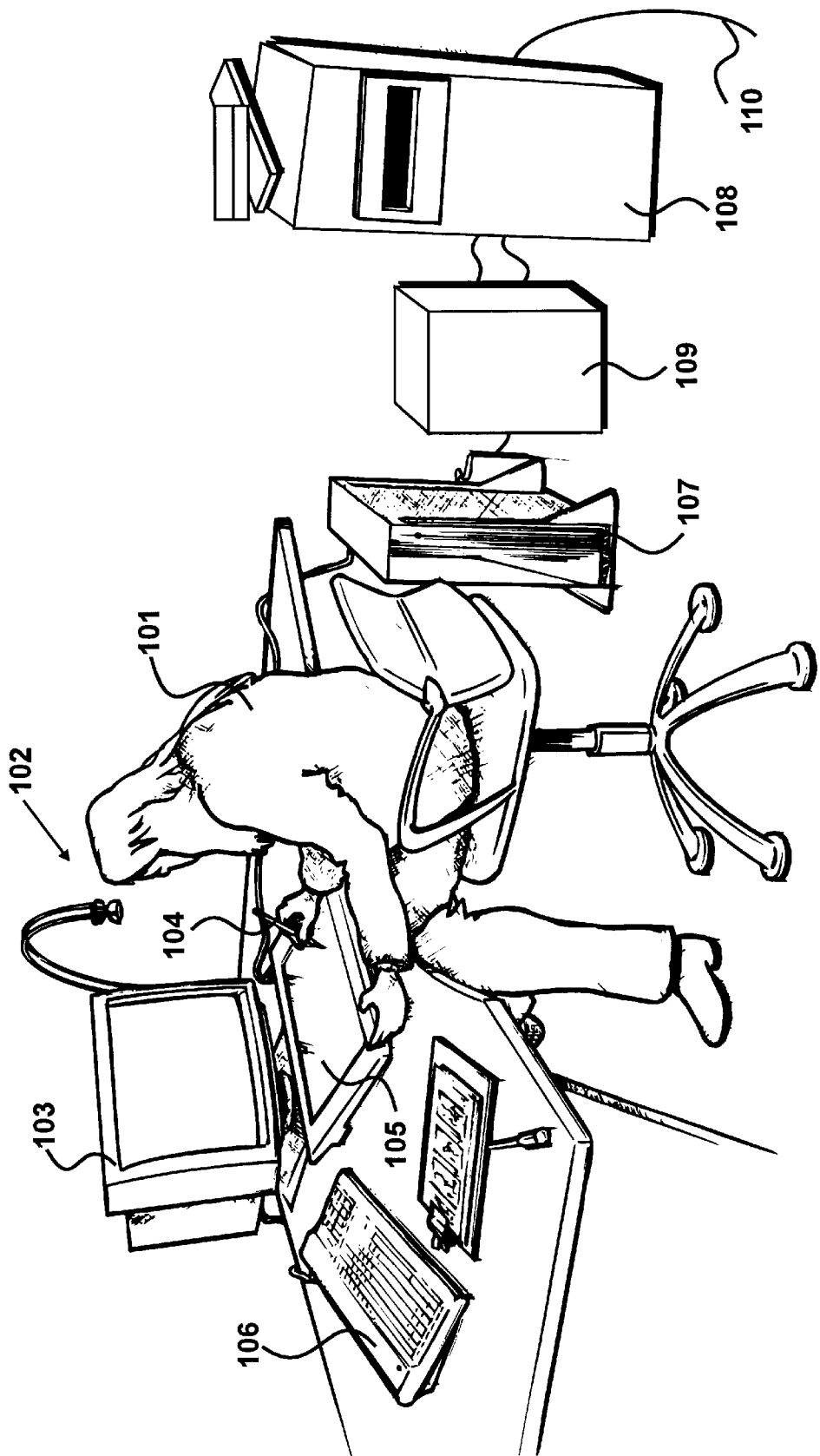
FIG. 1 shows a post-production video artist using an application for modifying images, including an applications platform, a video tape recorder and a video I/O device.

A post production facility is illustrated in FIG. 1, in which a video artist 101 is seated at a processing station 102.

Images are displayed to the artist via a visual display unit 103 and manual selections and modifications to the displayed images are effected in response to a manual operation of a stylus 104 upon a touch tablet 105. In addition, a conventional keyboard 106 is provided to allow alphanumeric values to be entered directly. The monitor 103, tablet 105 and keyboard 106 are interfaced to an image manipulating workstation 107, such as an Indigo2 Max Impact, manufactured by Silicon Graphics Incorporated, running compositing applications, such as "FLINT", licensed by the present assignee.

Image data is supplied to the workstation 107 from a D1 video tape recorder 108 via an image processing I/O device 109, such as that described in international patent publication WO 98/10586 in the name of the present assignee. Image data may also be supplied to the workstation 107 from cinematographic film or from a compressed video data source using a suitable interface device. The video tape recorder 108 and the I/O means 109 are both controlled directly in response to commands issued by the artist 101, thereby effectively embedding the operation of these machines within the application's environment. I/O device 109 is arranged to receive video data from the video recorder 108 at video rate and is arranged to write said data to its own internal storage devices at this rate. The I/O device's 109 internal storage is capable of storing 45,000 images. The I/O device 109 makes this stored data available to the workstation 107, or to similar devices via a high bandwidth network such as "HiPPI", via a network cable 110.

Figure 2:
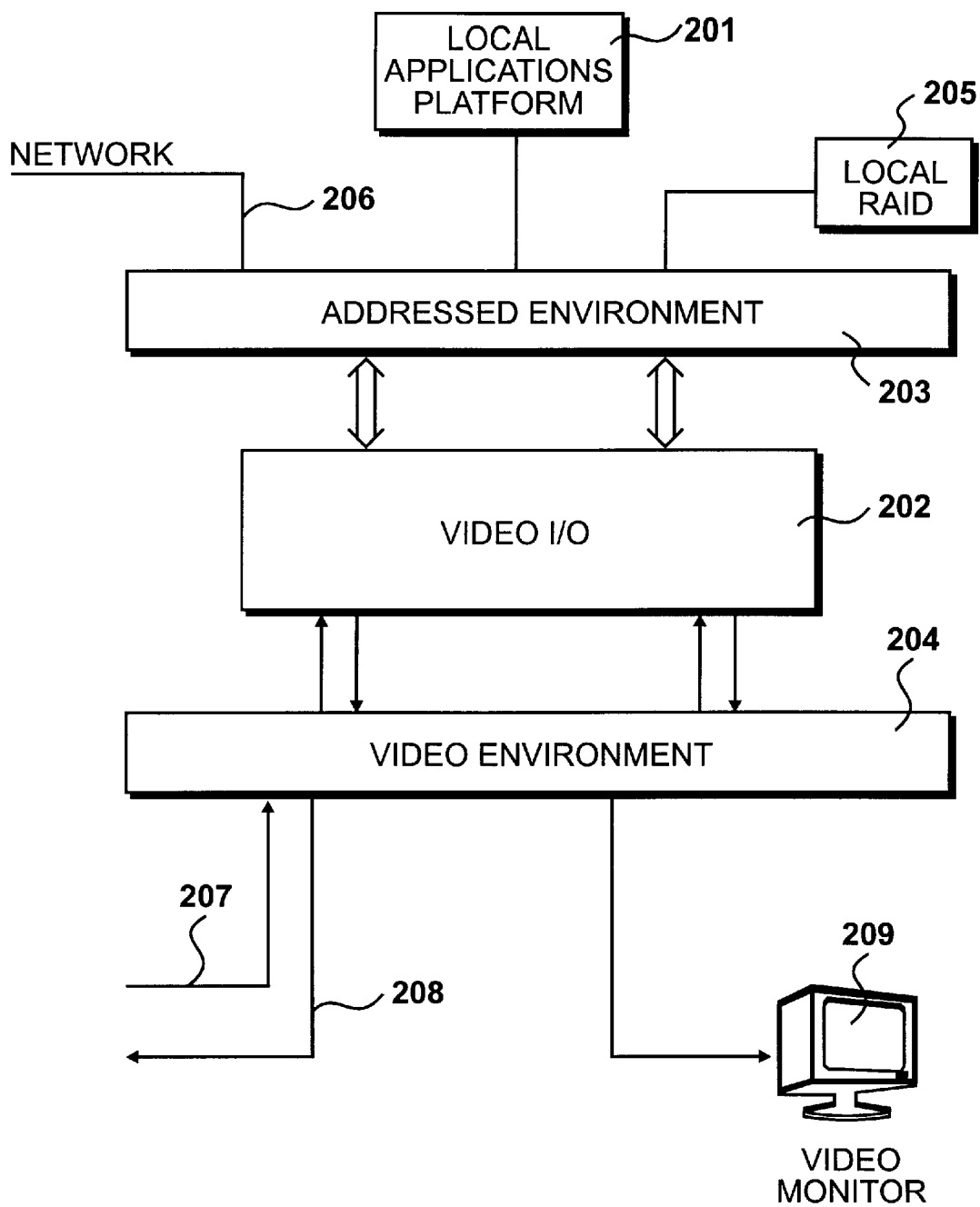
FIG. 2 identified a schematic representation of the environment shown in FIG. 1 in which a local applications platform performs image processing, communicating with other components in the environment.

The environment shown in FIG. 1 is illustrated schematically in FIG. 2. The workstation 107, its interfaces and its associated applications may be considered as a local applications platform 201. The I/O device 109 may be considered as comprising a video I/O means 202 having associated circuitry which may be considered as belonging to an addressed data environment 203 or to a video environment 204. The local application's platform 201 communicates with the video I/O means 202 via the addressed environment 203. The video I/O means 202 also communicates with a local array of disks 205 which may be configured in accordance with RAID protocols. Thus, the local array 205 may include a conventional SSA adapter, such as the type supplied by Path-Light Technology Incorporated of 767 Warren Road, Ithaca, N.Y. 14850 and the addressed environment 203 includes circuitry for transmitting and receiving data from the SSA adapter in accordance with conventional protocols. The addressed environment 203 also includes interface cards for connections to a HiPPI network 206.

A D1 serial digital input 207 supplies synchronized D1 video to the video environment 204. Similarly, if output video from the video environment 204 is supplied to an output cable 208. Interfaces 207 and 208 may be connected to a video tape recorder, such as tape recorder 108 shown in FIG. 1. The video environment 204 also supplies analog video signals to a video monitor 209, allowing an operator to view video images as they are being transferred through the image processing system.

Figure 3:
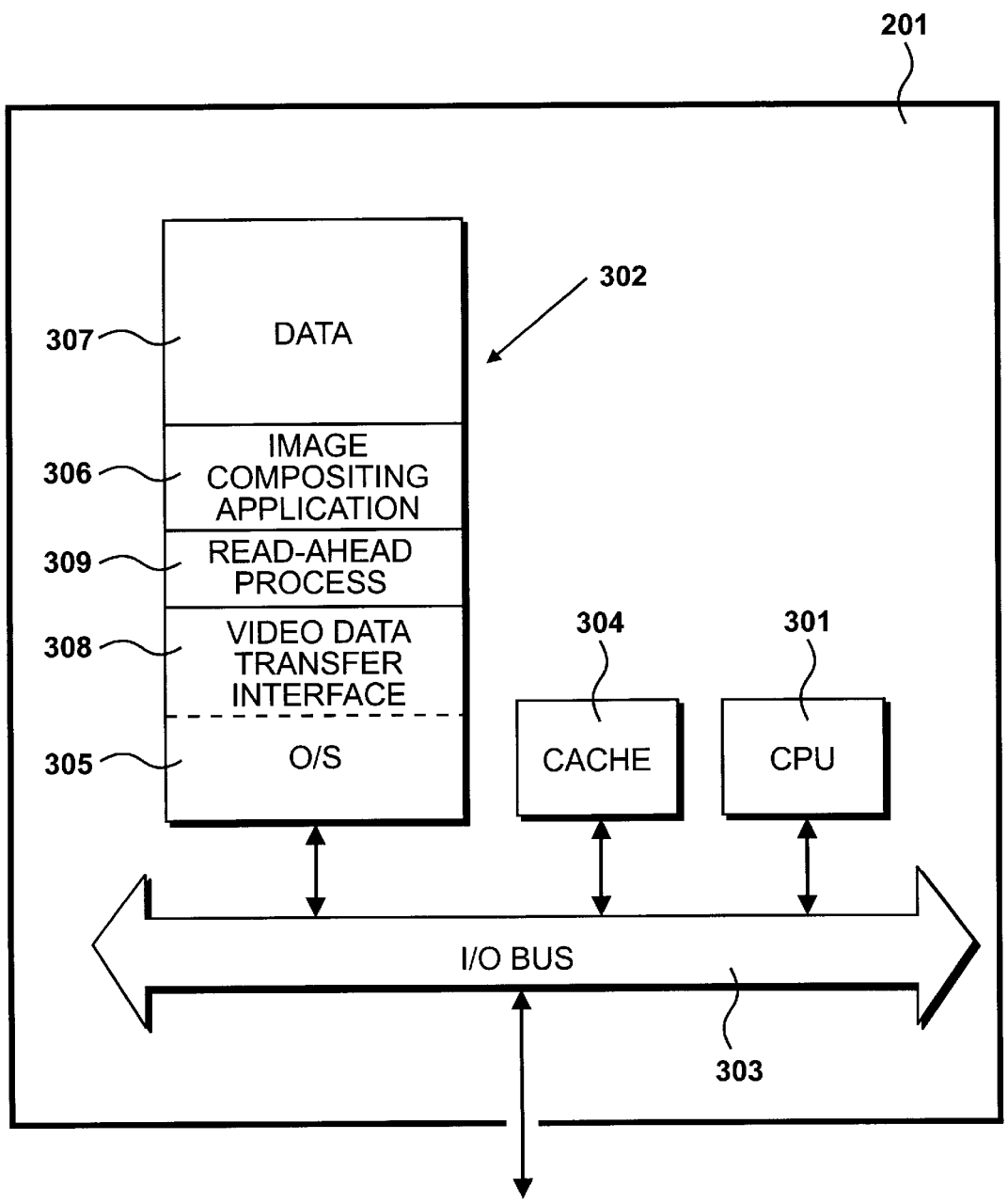
FIG. 3 illustrates a block diagram of the local applications platform identified in FIG. 2, including a RAM memory which stores an image compositing software application, a read-ahead process, a video data transfer interface implemented as part of the operating system and a data storage space.

FIG. 3 of the accompanying drawings illustrates a block diagram of local applications platform 201. The platform 201 comprises a central processing unit 301 which communicates with a local RAM memory 302 via an I/O bus 303. The platform 201 also includes a high speed cache RAM memory 304 which is smaller in capacity than RAM memory 302 but can transfer data to and from the CPU 301 at a higher rate. The I/O bus 303 also transfers data to and from the cache memory 304 as well as communicating between local applications platform 201 and the addressed environment 203.

The local RAM memory 302 is sufficiently large to store CPU instructions and data. RAM memory 302 stores an operating system for platform 201, including a video data transfer interface 308 as well as software applications including an image compositing application 306 and a read ahead process 309. Data 307 used by software applications such as image compositing is also stored in the local RAM memory.

Figure 4:
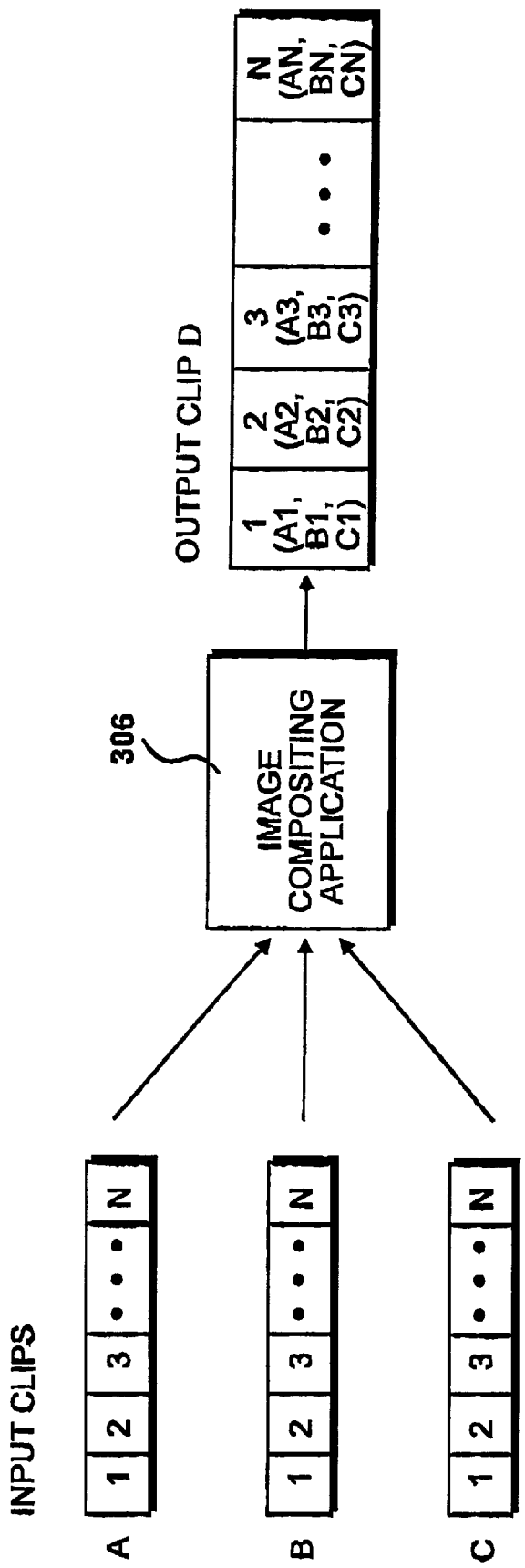
FIG. 4 illustrates an image compositing process which may be performed by the image compositing process software application identified in FIG. 3.

Operations performed by the image compositing application 306 are illustrated in FIG. 4. Typically, the compositing application receives two or more input images and generates an output image, composed from the inputs. Sequences of such images which, when viewed sequentially, give the impression of motion, are called clips. In FIG. 4 three such clips A, B and C are used to generate an output clip D. Clip A can consist of N images representing a background. Clip D can contain N images representing a foreground and clip C can contain N images used for keying or matte processing. Thus clip C contains image data which may be used to control the combination of clips A and B. Each image in clip D is composed from three input images A, B and C. The first image D1 in clip D will be composed from the first image of each of the input clips: A1, B1 and C1. The second output image D2 will be composed from input images A2, B2 and C2. This process will continue until output image DN is generated, which is composed from combining images AN, BN and CN.

Figure 5A:
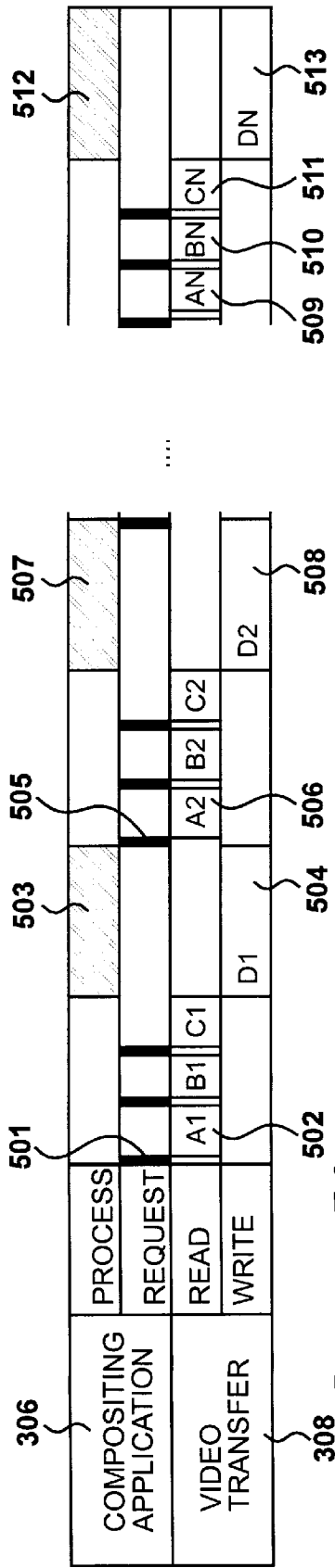
FIG. 5A illustrates a prior art implementation of the image compositing process illustrated in FIG. 4.

FIG. 5A shows a known implementation of the timing of read, write and processing steps as they would be performed by the local applications platform 201, shown in FIG. 3, to execute the image compositing process illustrated in FIG. 4. At step 501 the compositing application 306 makes a request for image data A1. At step 502, the input image A1 is transferred from addressed environment 203 to data storage 307 of the local RAM 302. Request and transfer steps are repeated for frames B1 and C1, at which point there is sufficient data for processing to proceed. At step 503 the input images are used to produce output image D1. Each pixel of output image D1 is stored as a result of the completion of part of the processing 503, resulting in storage of the output image D1 at approximately the same time as the compositing process is executed, as indicated at step 504.

At step 505 the compositing application 306 makes a request for next image data A2. At step 506 the image data A2 is transferred into the RAM memory by the video transfer process 308. At step 507 the second output composited image D2 is generated, and stored as part of the background video transfer process 308, at step 508. The compositing process continues in substantially the same manner up until the final set of input images, AN, BN and CN is transferred at steps 509, 510 and 511. At step 512 the final output image DN is generated, and finally stored at step 513.

A problem that arises from this method of implementing a compositing process is that the output image generating process at steps 503, 507 and 510, must wait for each set of input images to be transferred before commencing processing. This can result in a noticeable delay before each output image is generated, thereby resulting in an output clip D which is not displayed at a smooth rate if the output clip is being previewed whilst the image compositing process is taking place. In a typical high quality application, it may not be necessary to preview material while final results are being generated; this may be done at a later stage. Thus, the smoothness of image display is not an issue under these circumstances. However, if the processor is left idle during image transfer, this represents a considerable waste of valuable computational resources.

Figure 5B:
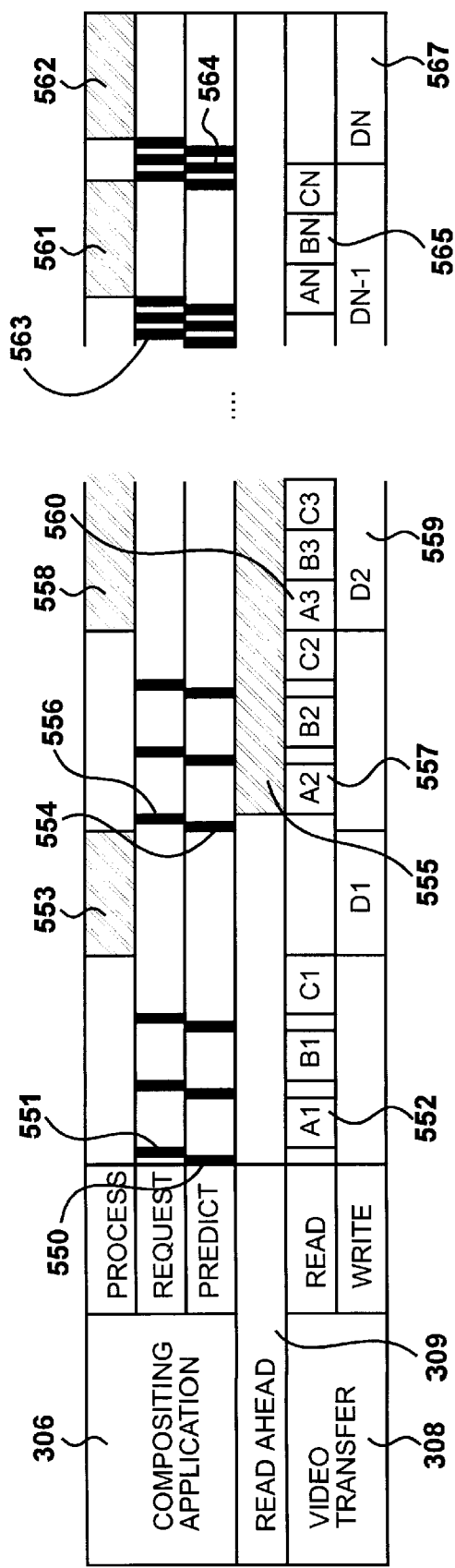
FIG. 5B illustrates an implementation of the image compositing process in accordance with a specific embodiment of the present invention.

FIG. 5B of the accompanying drawings illustrates an implementation of an image compositing process in accordance with a specific embodiment of the present invention. This illustrates the timing of read, write, processing, and read ahead steps as they are performed by the local applications platform 201. At the beginning of the processing sequence, the compositing application 306 already knows which input images are initially required. Before making a request for the input images, an attempt to predict subsequent images is made at step 550, on the basis of observed patterns in previously acquired images. Since there are no previous images at the start of processing, a prediction cannot be made. Prediction processing step 550 is relatively short, and thereafter a request is made for the first input image to be transferred at step 551. At step 552, the first input image A1 is transferred from addressed environment 203 to data storage 307 of the local RAM 302. Once the loading of image A1 is completed, the compositing application makes another attempt at prediction, followed by a request for the second input image B1. These steps are repeated again for the third input image C1. At step 553 the input images are processed, and stored as output image D1.

At step 554 the compositing application 306 already knows that input image A2 is required next. Before making a request for this image to be transferred, at step 554 an attempt is made to predict the subsequent image that will be required, based on observation of patterns of previously loaded input images. Since there is now a recorded history from a previous load sequence, it is possible for a prediction to be made at step 554. As a result of this prediction, the read ahead process 309 commences background processing to transfer the predicted images from the addressed environment 203 to the read ahead cache 304 shown in FIG. 3.

A background read ahead operation is illustrated at step 555. As soon as the prediction step 554 is completed, the compositing application 306 makes a request for the next input image A2 at step 556. At step 557 the A2 image is transferred into RAM memory 302. The prediction, request and loading steps are repeated for the remaining two input images B2 and C2, that are required before processing can commence. At step 558 the second output composited image D2 is generated, and stored at step 559. During processing 558 and storage 559, the read ahead process 309 instructs the video transfer process 308 to load predicted images A3, B3 and C3 into the read ahead cache 304. This transfer of predicted images is illustrated at step 560, and is executed as a background video transfer process.

As a result of predicted images already being loaded into the cache 304, processing of images does not always have to pause for a substantial period of time. This is illustrated at steps 561 and 562, where images for processing are already loaded into the cache, so that requests do not have to be made to the video transfer process 308. The prediction and request operations execute in minimal time, as indicated at sequences 563 and 564, and processing can continue with a minimal delay. The compositing process continues substantially in this manner up until the final set of input images is transferred at step 565. At step 562 the final output image DN is generated and stored at step 567.

In the present embodiment, the prediction algorithm operates as part of the foreground compositing application 306, and is executed each time a request for frames is made, which is the earliest time at which new data for the prediction algorithm is available. Given the asynchronous nature of the foreground and background processes, the invention makes it possible, by predicting transfer requests, for the background video transfer process 308 to "get ahead" of the foreground compositing application 306.

Figure 6:
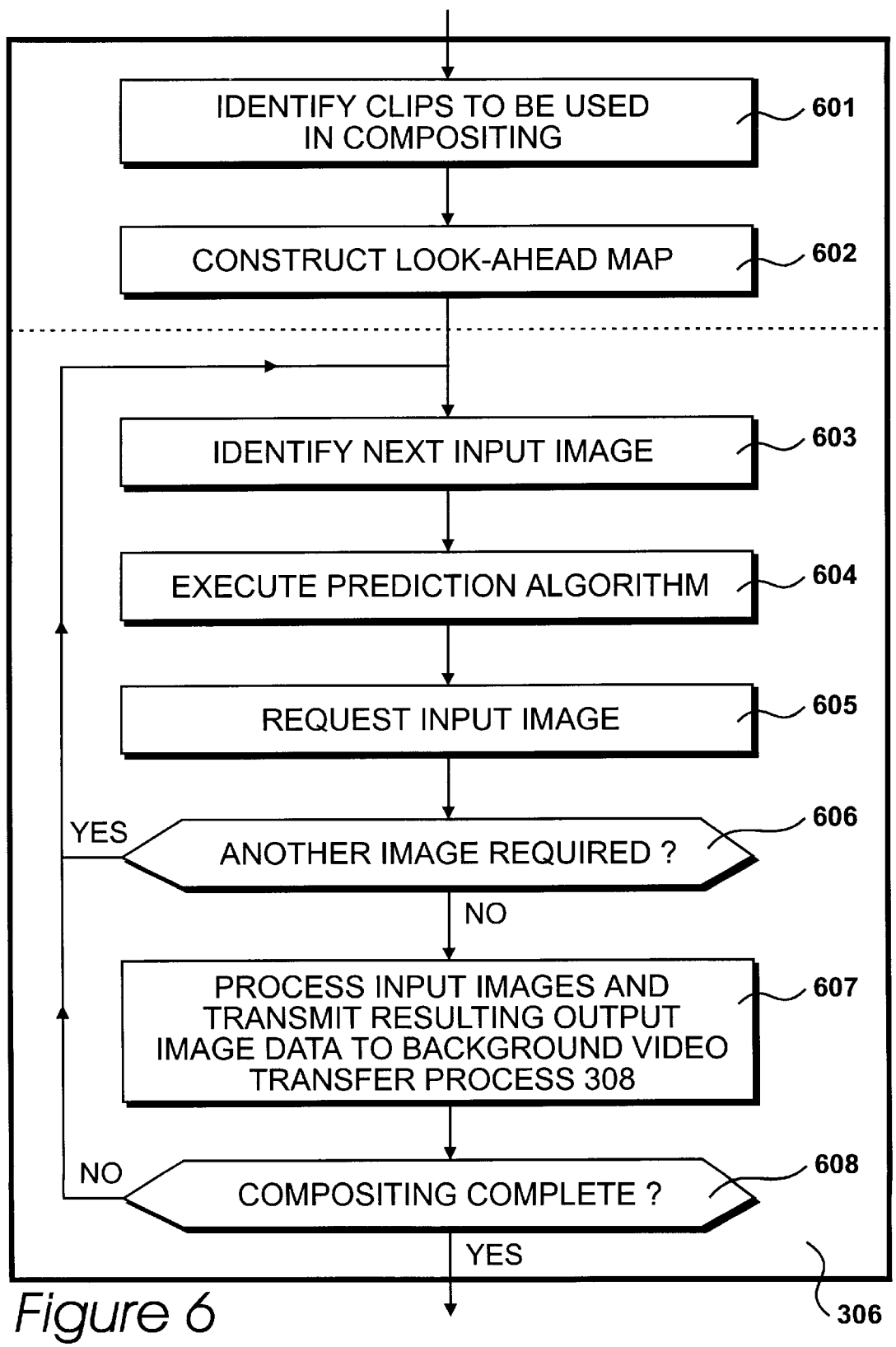
FIG. 6 illustrates steps performed by the compositing application identified in FIG. 3, including executing a prediction algorithm and requesting an input image.

The steps performed by the compositing application 306, according to the preferred embodiment of the present invention, are illustrated in FIG. 6. At step 601, all images in all the input clips to be used in the present compositing process are identified. Thus, at this step, clips A, B and C are identified. At step 602, a look ahead map is constructed by examining the order of images in each of the identified input clips. Steps 601 and 602 are initialization steps performed prior to compositing the image sequence. Having constructed the look-ahead map, it is then possible for compositing and prediction to proceed in accordance with the steps illustrated in FIG. 5. At step 603, the next image is identified. In the initial case, this will be image A1. At step 604, the prediction algorithm is executed, as also indicated at step 550 in FIG. 5. At step 605 a request is made for the next image to be transferred, and processing is suspended until this image has been transferred, either slowly from the addressed environment 203, as is initially the case, or more quickly from the read ahead cache 304, which may occur when successful predictions have been made. Step 605 corresponds to steps 551 and 554 in FIG. 5.

A question is asked at step 606 as to whether another image is required before compositing can commence. In the example shown in FIG. 5, three input images are required, from clips A, B and C. Thus, steps 603 to 606 are executed three times, before control is directed to step 607. At step 607, the input images are processed, and the resulting image is transmitted to the background video transfer process 308. Step 607 corresponds, for example, to steps 558 and 559 shown in FIG. 5. At step 608, a question is asked as to whether compositing of the current sequence is complete. If answered in the negative, control is directed to step 603, whereafter new input images are identified, predicted, loaded and processed. Alternatively, the processing may be complete, thus marking the end of the current sequence of compositing operations requested by the artist 101.

Figure 7:
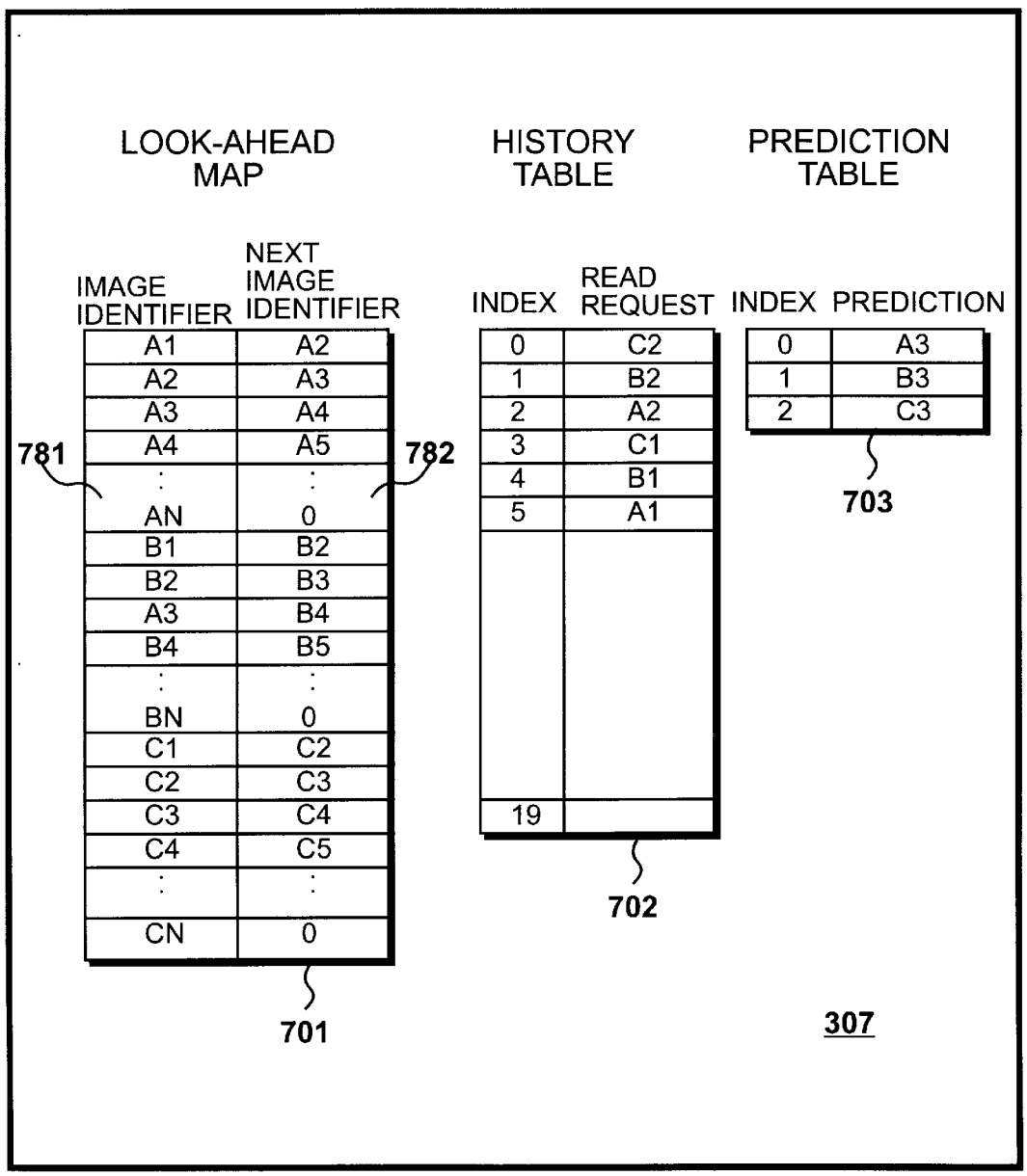
FIG. 7 illustrates data structures used by the prediction algorithm identified in FIG. 6, comprising a look-ahead map, a history table and a prediction table.

FIG. 7 of the accompanying diagrams illustrates the portion of the data store 307 of RAM memory 302 which is used by the video data transfer interface's prediction algorithm. The algorithm requires three storage arrays, one for storing the look-ahead map 701, one functioning as the history table 702 of read requests and another being the prediction table 703 which contains the storage addresses of predicted frames. These storage tables are implemented as conventional data arrays.

The look-ahead map 701 is a data array comprising 45,000 entry lines, corresponding to the number of frames which can be stored in the video I/O device 202. Each entry line of the look-ahead map contains an image identifier 781 used to uniquely identify each image. The entry line also contains a next image identifier 782 which identifies the next image in a clip. An entry for an image can be positioned anywhere within the look-ahead map, but usually individual clips of images will be stored in contiguous locations.

The history table 702 is a data array having 20 entries, indexed zero to 19. Each entry contains the index of an image which was requested, with the most recent read request stored at entry zero. The history table has a maximum number of entries, NH, equal to 20 the number of frames which the image processing application FLINT deals with.

The prediction table 703 is constructed with reference to the look-ahead map and the history table, and has a variable number of entries, depending on the patterns of image access that are discovered.

Figure 8:
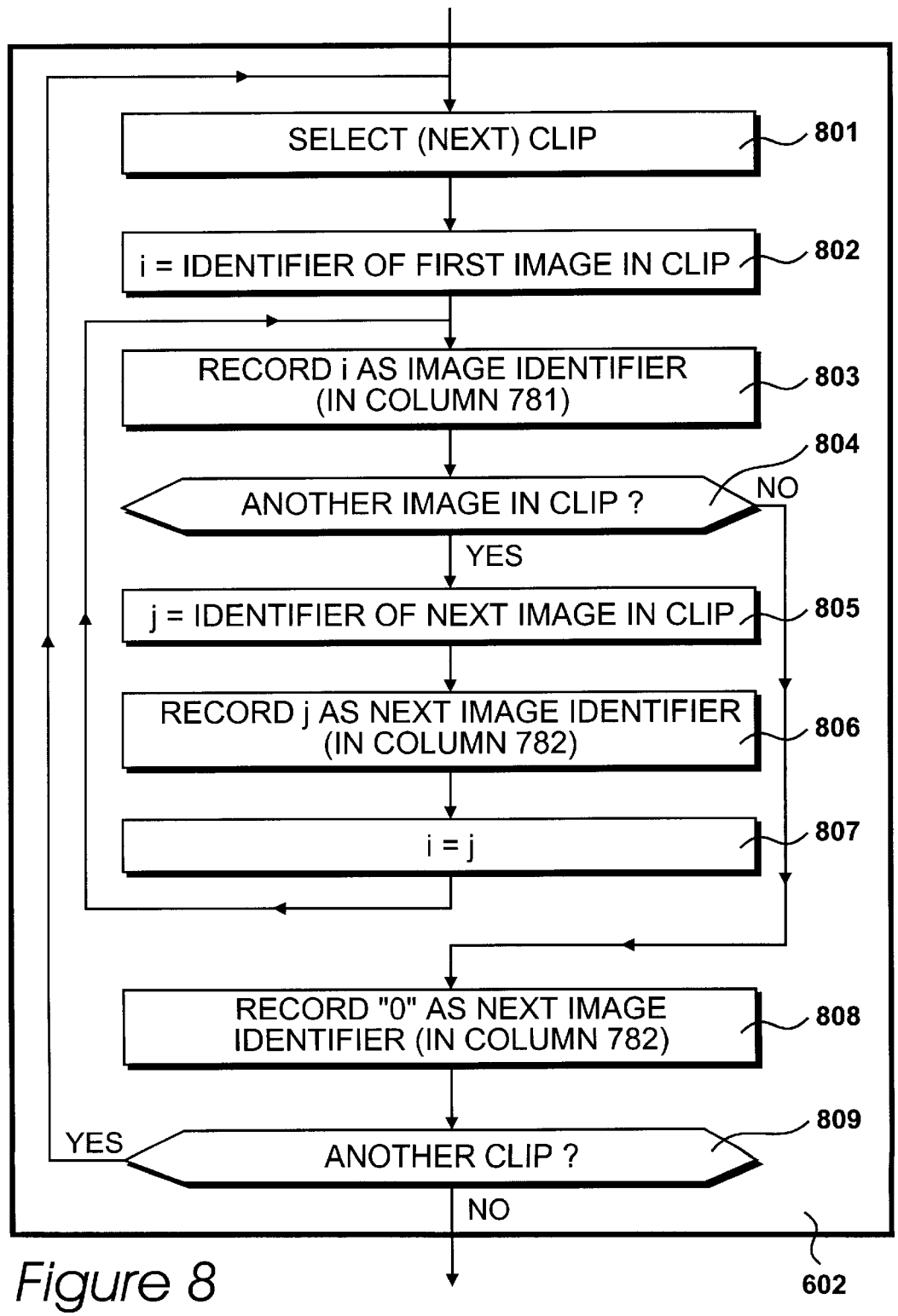
FIG. 8 illustrates steps taken to create the look-ahead table shown in FIG. 7.

FIG. 8 illustrates the steps performed to initially create the look ahead map 701, identified as step 602 shown in FIG. 6. At step 801, the first clip, in this case of three, is selected. At step 802 the identifier of the first image in the clip, initially A1, is identified temporarily with the variable i. At step 803 the identifier recorded in variable i is stored in the next available entry in the look-ahead table column 781 shown in FIG. 8. Thus A1 is stored in the top left hand entry of the look-ahead table 701 shown in FIG. 7. At step 804 a question is asked as to whether there is another image for consideration in the presently selected clip. If answered in the negative, control is directed to step 808. Alternatively, if there is another image to be considered in the currently selected clip, control is directed to step 805. In step 805, the identifier of next frame of the current clip is stored in a temporary variable j. Thus, on the first occasion, j is given the identifier A2. At step 806, the identifier stored in variable j is stored in the next location in the next image identifier column 782 of the look ahead table. Thus the top row of the look ahead table now contains the identifiers A1 and A2.

At step 807, the variable i is given the value of the contents of variable j, initially being equal to A2, and control is directed back to step 803. The table continues to be constructed in this manner until there are no more images in the current clip, as indicated by the final image identifier, which is AN, for the first clip. When there are no more additional images in the clip, step 804 directs control to step 808, where a value of zero is recorded as the image identifier in column 782. Thus the last row entry for the first clip contains identifiers AN and 0. At step 809, a question is asked as to whether another clip is available for selection. If another clip is available, control is directed back to step 801, thereby repeating the process described above for clips B and C, thereby building the contents of the look-ahead table 701 as shown in FIG. 7.

Figure 9:
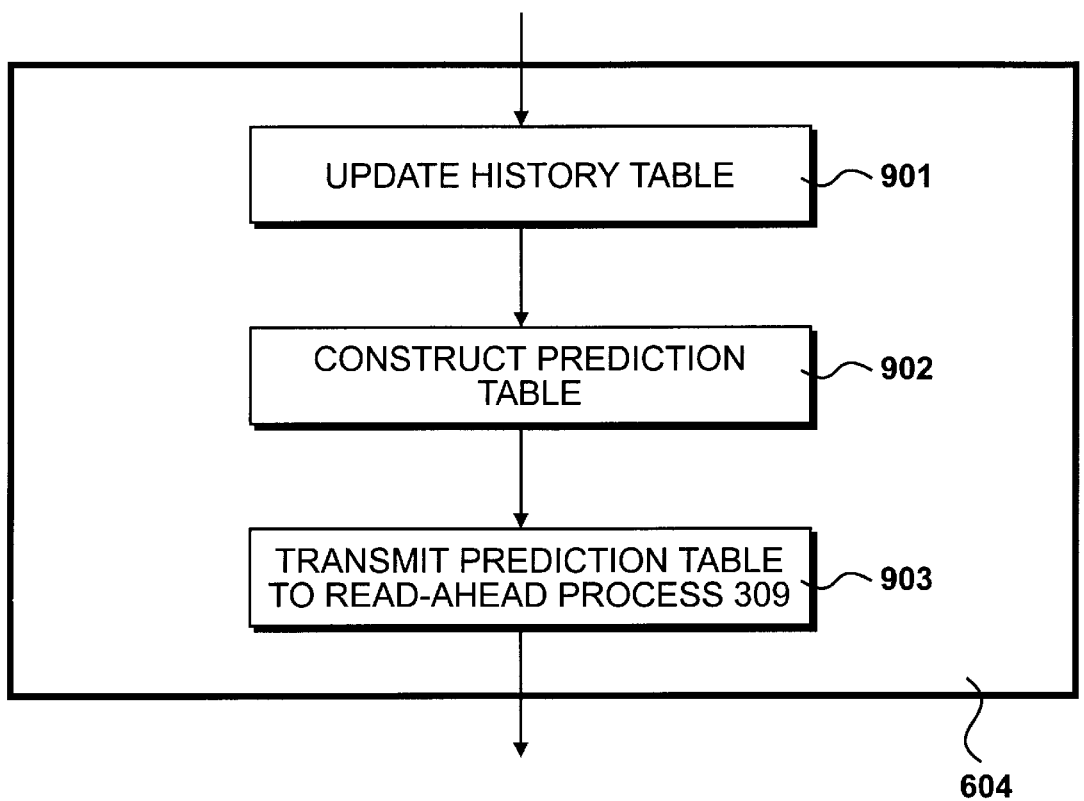
FIG. 9 summarises steps performed when executing the prediction algorithm indicated in FIG. 6, including steps of updating the history table, constructing the prediction table, and transmitting the prediction table to the read ahead process indicated in FIG. 3.

Execution of the prediction algorithm, as indicated at step 604 in FIG. 6, is summarized in FIG. 9. At step 901, the history table 702 is updated. At step 902, the prediction table 703 is constructed. At step 903, the prediction table is transmitted to the read ahead process 309.

Figure 10:
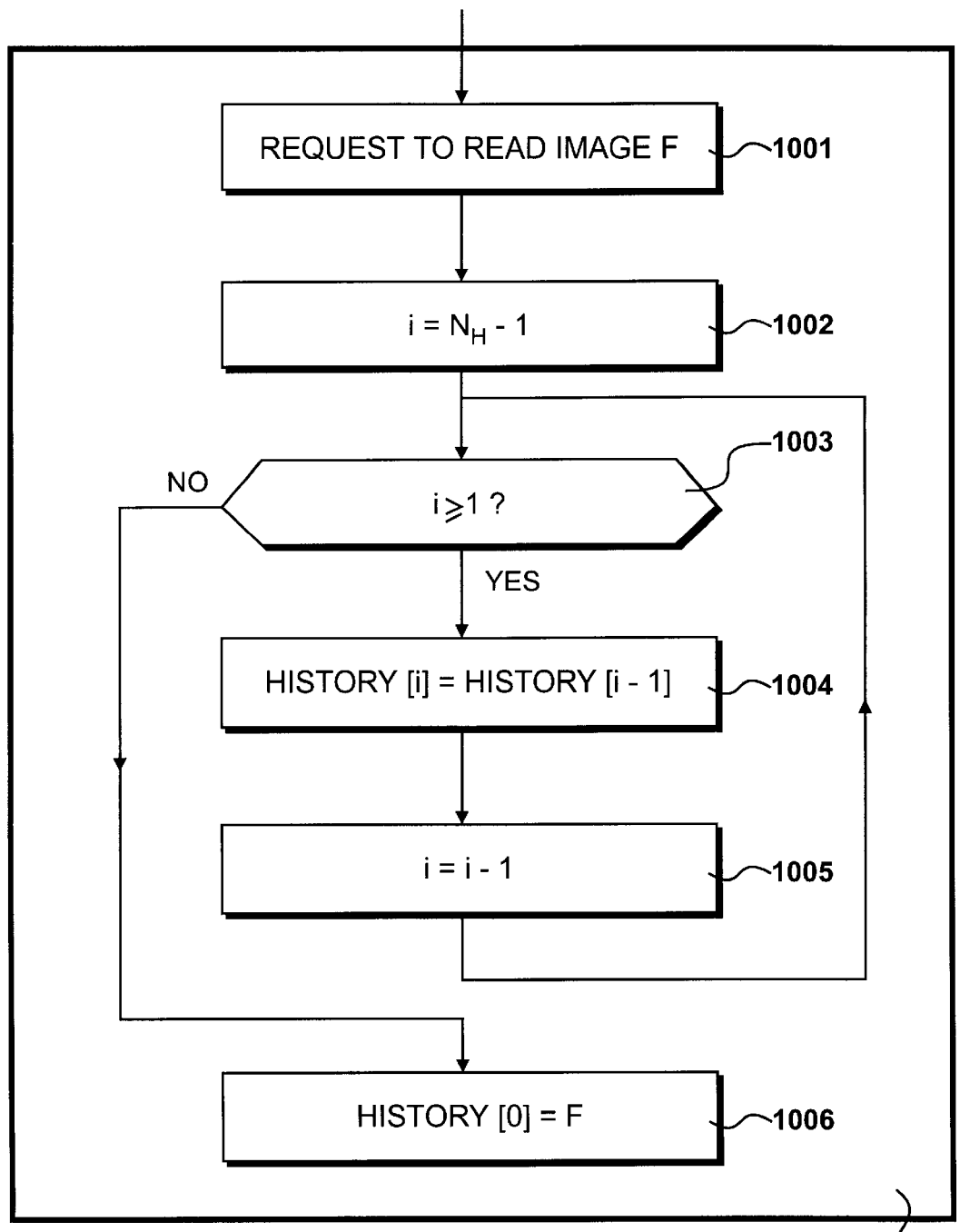
FIG. 10 details the step of updating the history table, indicated in FIG. 9.

FIG. 10 of the accompanying drawings illustrates the steps performed to create and update the history table 702, identified as step 901 of the prediction algorithm shown in FIG. 9. At step 1001 a read request for a frame F is detected. At step 1002, a counter is initialized with the value NH−1, corresponding to the index of the final entry in the history table array. NH is the number of entries in the history table, which is twenty. At step 1003 a question is asked whether the value of the counter is greater than or equal to 1. If the question asked at step 1003 is answered in the affirmative, then the read request stored in the entry corresponding to the counter is replaced by the read request stored in the previous entry of the history table array, indexed by the value of the counter minus 1. At step 1005 the counter is decremented by 1 and control is passed back to step 1003. If the question asked at step 1003 is answered in the negative, control is passed to step 1006 where the first entry in the history table, index zero, stores the identifier of frame F. These steps have, in effect, shifted the lower 19 entries of the history table downwards and stored the most recent read request in the first entry of the history table.

Figure 11:
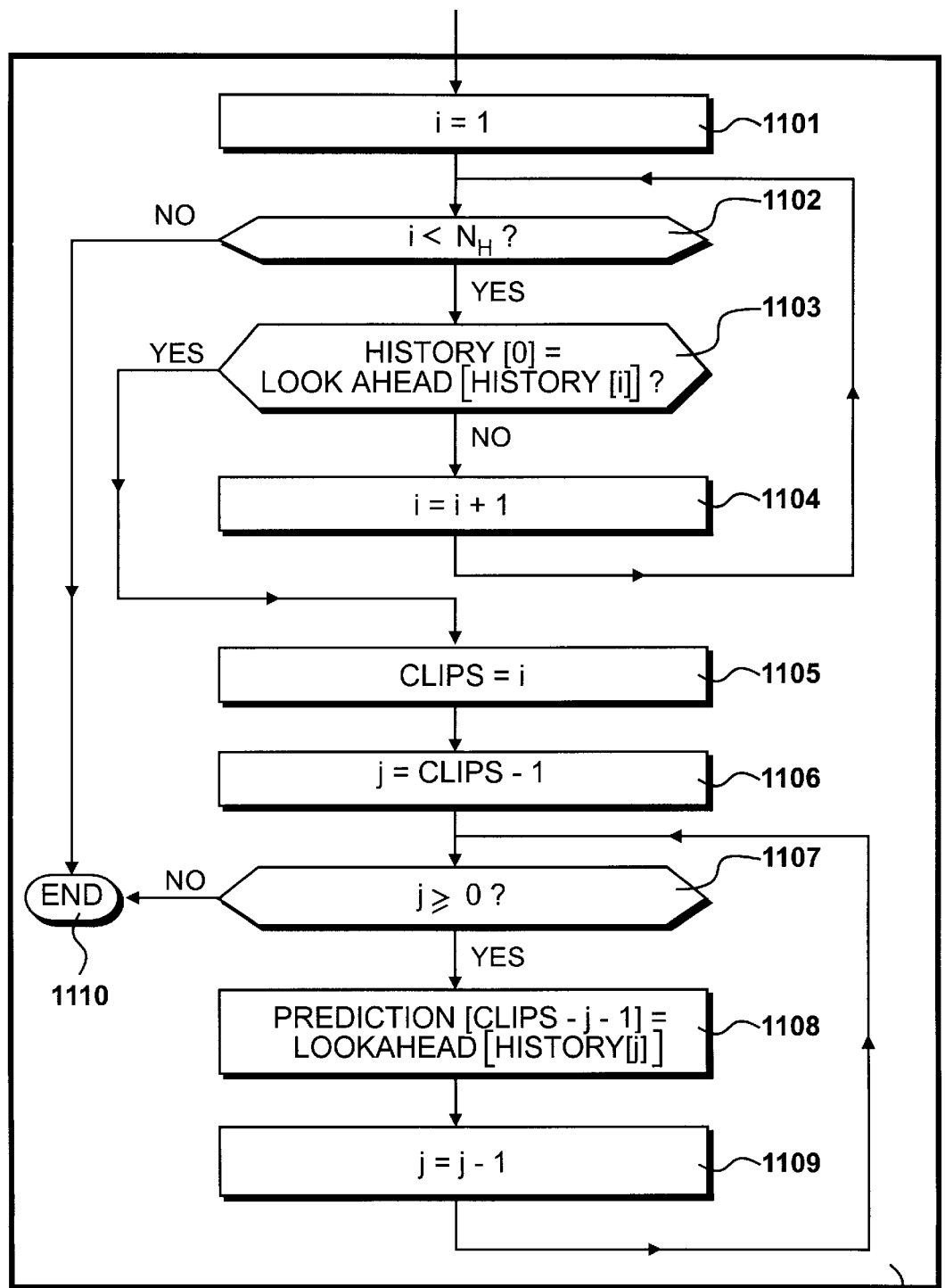
FIG. 11 details the step of creating a prediction table, indicated in FIG. 9.

FIG. 11 of the accompanying drawings illustrates the steps performed to implement the prediction algorithm and create the prediction table, identified as step 902 in FIG. 9.

At step 1101 a counter i is initialized to the value 1. At step 1102 a question is asked whether the value of the counter is less than NH, the number of entries in the history table. If the counter is equal to NH, this indicates that all entries in the history table have been considered. Thus, control is directed thereafter to step 1110, where the construction of the prediction table is ended.

If the question asked at step 1102 is answered in the positive, control is passed to step 1103 where a question is asked as to whether the first entry, index zero, in the history table, representing the most recent readable request is equal to the next image identifier in an entry of the look-ahead table addressed by the read request stored in the history table at the entry addressed by the counter i. If the question asked at step 1103 is answered in the negative, the counter is incremented by 1 at step 1104 and control is passed back to step 1102. If the question asked at step 1103 is answered in the negative control is passed to step 1105.

At step 1105 the current value of the counter represents the number of individual clips of input images which the prediction algorithm considers are currently being used by the image compositing process. This value is stored in a variable named CLIPS. At step 1106, a counter stored in variable j is initialized to the value of CLIPS−1. At step 1107 a question is asked whether the value of counter j is greater than or equal to zero, if this question is answered in the negative then the algorithm terminates at step 1110. If the question asked at step 1107 is answered in the affirmative then control is passed to step 1108. At step 1108 an entry in the prediction table having an index equal to the value of CLIPS−j−1 is addressed. The image identifier for the next image stored in the entry of the look-ahead table indexed by the image index stored at entry j of the history table is written to the prediction table. At step 1109 the counter is decremented by 1 and control is passed back to step 1107.

Figure 12:
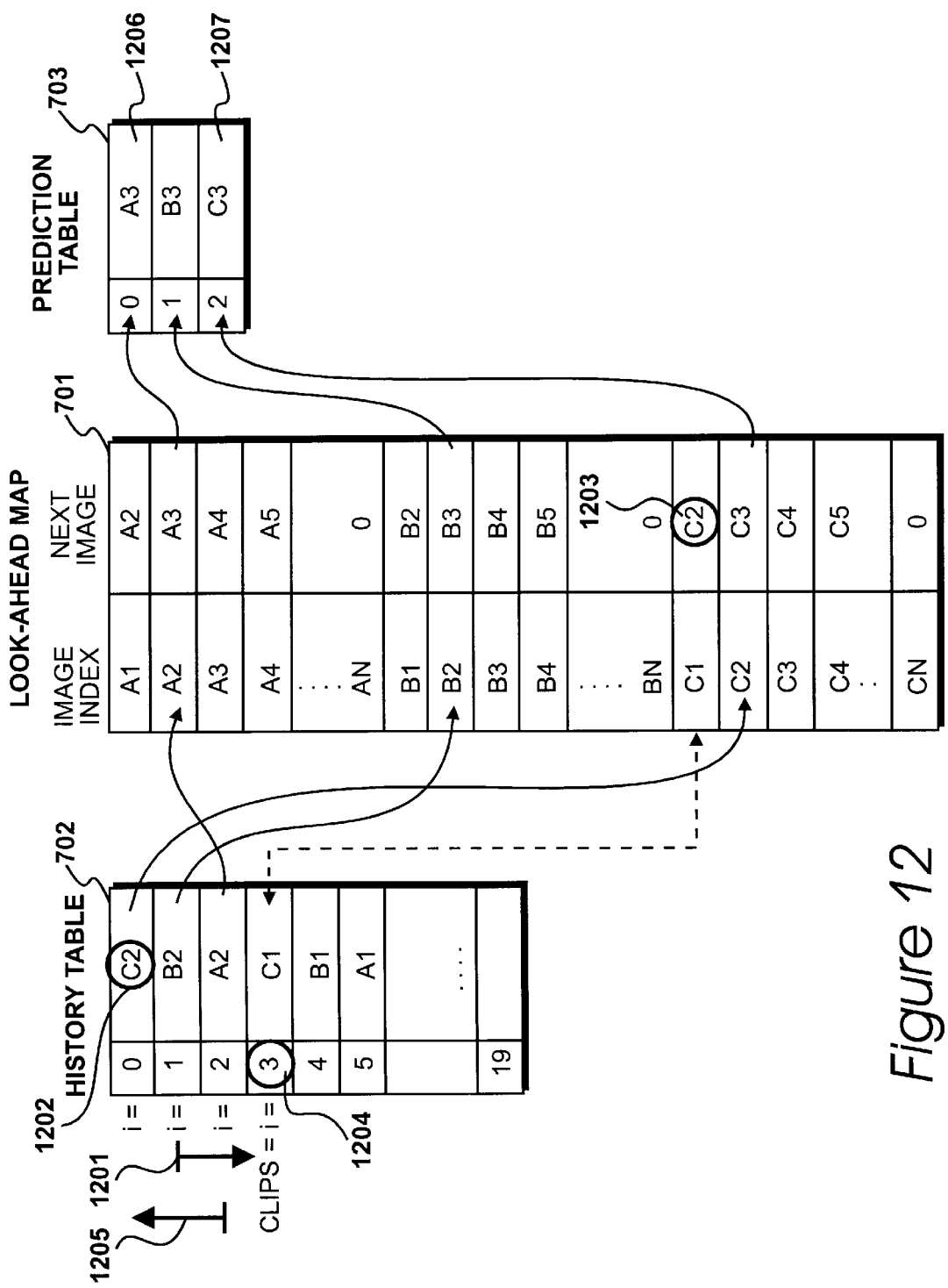
FIG. 12 illustrates the creation of the prediction table according to the steps detailed in FIG. 11.

An example of the execution of the prediction algorithm identified as step 604 in FIG. 6 is illustrated in FIG. 12. The history table 702 contains six read requests, the most recent stored at entry zero: C2, B2, A2, C1, B1 and A1. Steps 1102, 1103 and 1104 identified in FIG. 11 essentially search downwards through the history table from entry 1, illustrated by arrow 1201 in FIG. 12, comparing each next image index in the look-ahead map 701 addressed by the contents of the history table with the most recent frame request stored in entry 0 of the history table. When a match is found, illustrated by the circled image indexes 1202 and 1203 in FIG. 12, the value of the counter 1204 represents the number of individual clips which the prediction algorithm considers the image compositing process to be using currently. The prediction algorithm then essentially works upwards through the history table from the entry above identified entry, illustrated by arrow 1205 using each entry in the history table to address the look-ahead map.

The next image's identifier from the addressed entry line in the look-ahead map is written to the prediction table 703, with the least recent addressed history table entry corresponding to the first entry in the prediction table 1206. This procedure continues until the first entry in the history table is reached, with the most recent frame request in the history table resulting in the last image identifier 1207 written to the prediction table.

Figure 13:
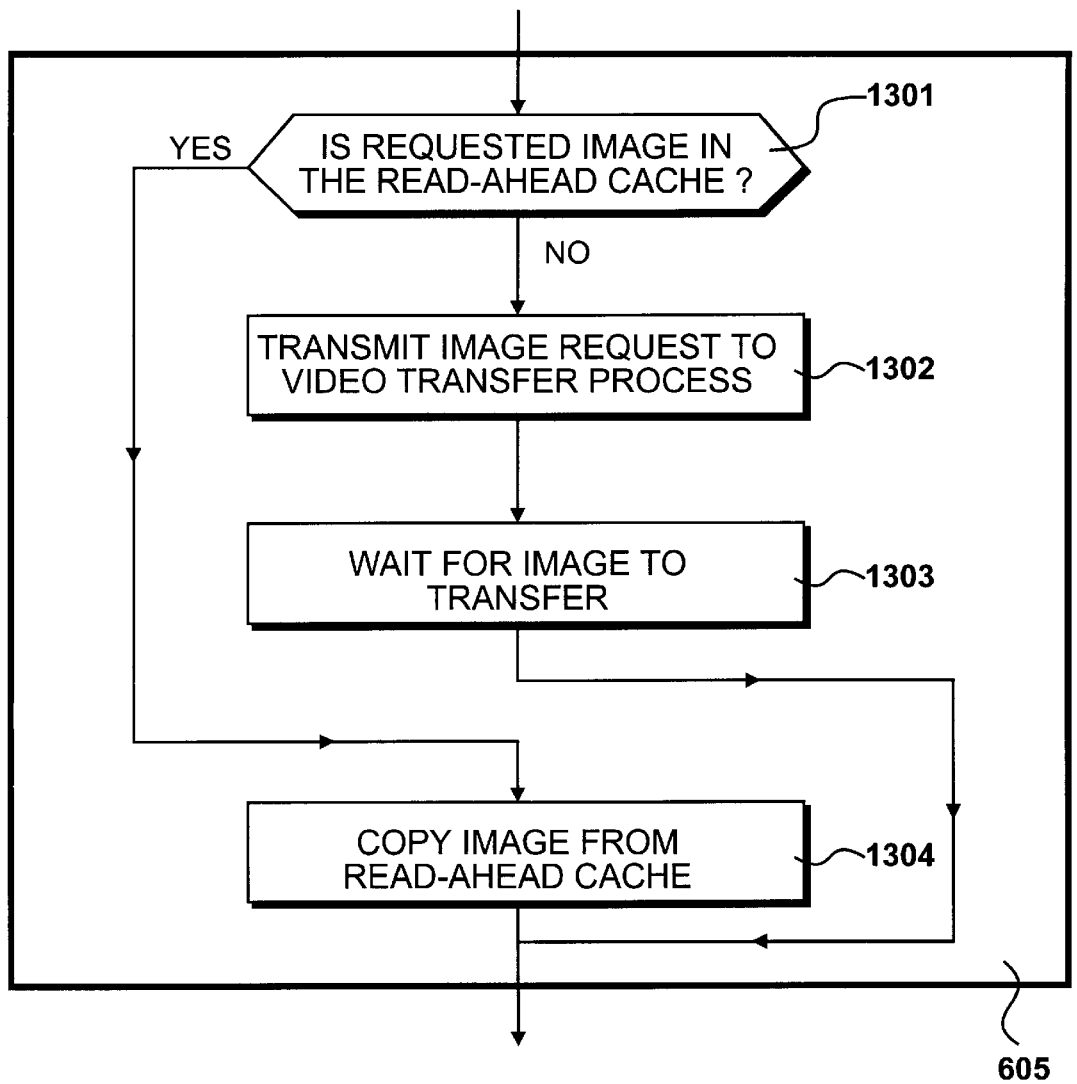
FIG. 13 details the step of requesting an input image, indicated in FIG. 6.

FIG. 13 of the accompanying drawings illustrates the steps taken to request and read an image, identified as step 605 in FIG. 6. At step 1301 A question is asked as to whether the requested image is in the read ahead cache 304. If the image is in the cache, control is directed to step 1304, where the image is copied from the cache 304 into the data section of the RAM 302. Alternatively, if the requested image is not in the cache, control is directed to step 1302, where an image request is transmitted to the background video transfer process 308. At step 1303, the image is transferred from the addressed environment 203 to the local data RAM 302. This process takes significantly longer than reading the image from the cache 304. Images are available in the cache by virtue of their having been successfully predicted by the prediction algorithm, and having been transferred by the read ahead process 309, as a background operation while other processing tasks are performed.

Figure 14:
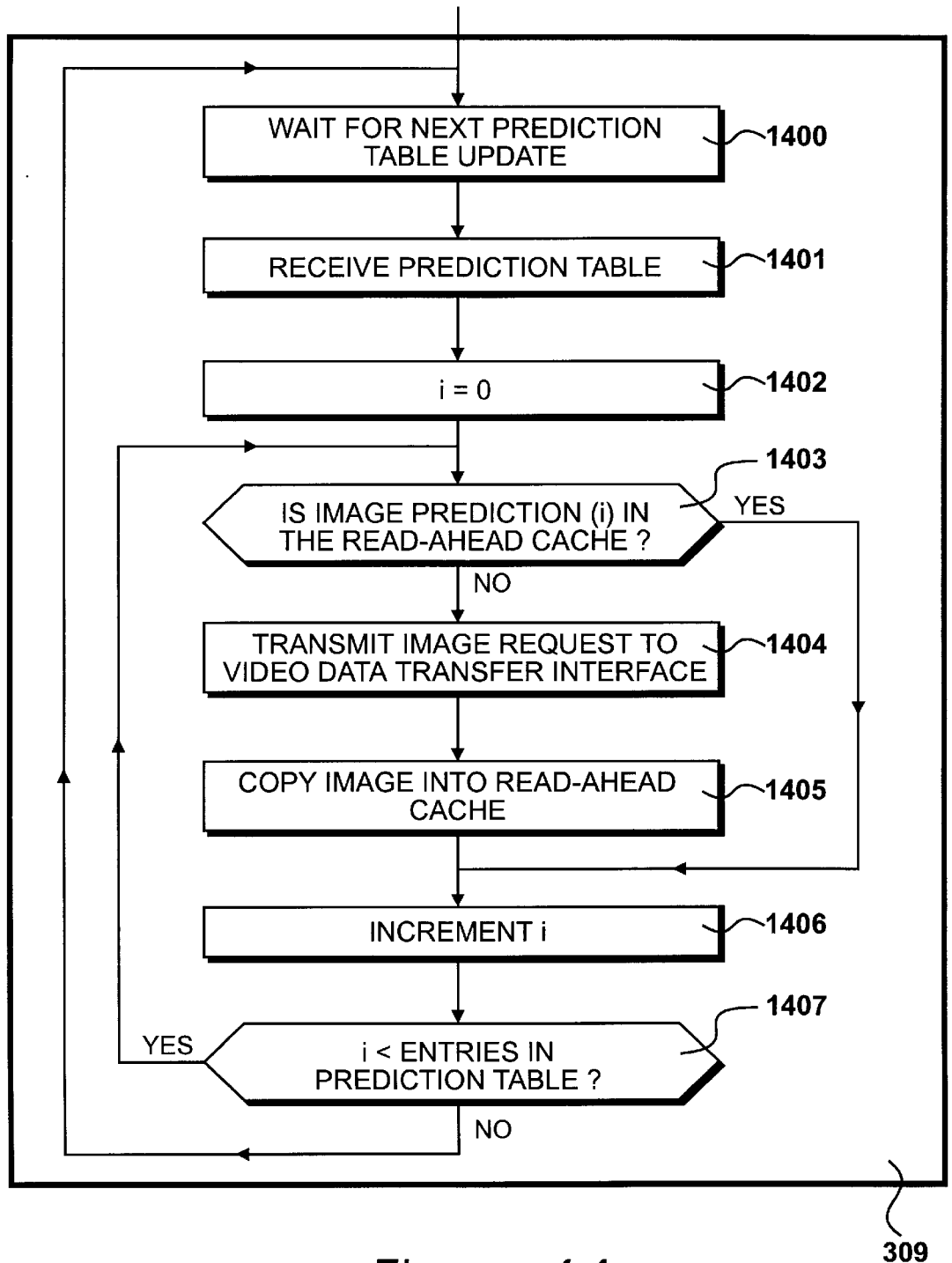
FIG. 14 illustrates steps taken by the read-ahead process indicated in FIG. 3 in response to the step of transmitting a prediction table, as indicated in FIG. 9.

Details of the operation of the background read ahead process 309, shown in FIG. 3, and further indicated in FIG. 5, are shown in FIG. 14. At step 1400 the read ahead process waits until the next prediction table is updated by the prediction algorithm. At step 1401 the read ahead process receives the prediction table 703, that has been created by the prediction algorithm. At step 1402, a temporary counter, i, is set to zero. At step 1403 a question is asked as to whether the entry in the image prediction table 703 indexed by the counter i, is already loaded in the read ahead cache 304. If this question is answered in the affirmative, control is directed to step 1406. Alternatively, if the image in the prediction table has not yet been loaded, control is directed to step 1404, where a request for the image is transmitted to the background video transfer process 308. At step 1405, the resulting received data is copied into the read-ahead cache 304. At step 1406 the counter i is incremented, and at step 1407 a question is asked as to whether counter value i is still less than the current number of entries in the prediction table. If answered in the positive, control is directed back to step 1403, so that the remaining predicted images may be checked and transferred if necessary. Alternatively, if i is equal to the number of entries in the prediction table, this indicates that all the predicted images are loaded in the cache. Control is then directed back to step 1400, where the read ahead process is suspended until a new prediction table is received.

What we claim is:

1. A method of transferring image data describing sequences of images representing a plurality of clips from a storage device to a high speed memory for image processing, comprising the steps of:

predicting which image data from a plurality of clips will be required by an image processing application that combines the image data from the plurality of clips, after processing image data currently in said high speed memory including the substeps of:
creating a look-ahead map having data describing said plurality of clips;
creating a history table of requested images; and
searching for patterns in said look-ahead map and said history table to predict images which will be required by said image processing application; and transferring said predicted image data from said storage device to said high speed memory while processing said image data currently in said high speed memory.

2. A method according to claim 1, wherein indications of said predicted images are stored in a prediction table.

3. A method according to claim 1, wherein said data describing each image in said look-ahead map comprises physical storage address on said storage device of the next image in one of said clips.

4. A method according to claim 1, wherein said searching for patterns comprises the steps of:

calculating the number of individual ones of said clips are stored in said history table;

using said calculated number to identify an entry in said history table; and addressing history table entries from said identified entry in order to address said look-ahead map to obtain physical storage addresses of said predicted images.

5. A computer-readable medium having computer-executable instructions for performing steps comprising:

predicting which image data from a plurality of clips will be required by an image data processing application that combines the image data from the plurality of clips including the substeps of:
creating a look-ahead map having data describing said plurality of clips,
creating a history table of requested images; and
searching for patterns in said look-ahead map and said history table to predict images which will be required by said image processing application; and transferring said predicted image data from a storage device to a high speed memory device while processing current image data.

6. A computer-readable medium according to claim 5, wherein said computer-executable instructions include instructions for storing an indication of predicted images in a prediction table.

7. A computer-readable medium according to claim 6, wherein said computer-executable instructions include instructions for relating an indication of predicted images to image data.

8. A computer-readable medium according to claim 5, wherein said computer-executable instructions include instructions for performing said search for patterns, comprising the steps of calculating the number of individual ones of said clips in said history table, using said calculated number to identify an entry in said history table, and addressing said history table entries from said identified entry in order to address said look-ahead map to obtain indications of said predicted images.

9. Image data transfer apparatus, comprising processing means including a processor executing one or more image processing application(s) that combines images from a plurality of clips, a high speed memory and a storage device, wherein said processor is arranged to transfer image data describing sequences of images representing a plurality of clips from said storage device to said high speed memory by predicting image data which will be required by said image processing application(s) after processing image data currently in said high speed memory, and predicting image data is performed by:
storing a look-ahead map comprising data describing said plurality of clips;
storing a history table of requested images; and
searching for patterns in said look-ahead map and said history table to predict images which will be required by said image processing application(s); and
transferring said predicted image data from said storage device to said high speed memory while processing said current image data.

10. Apparatus according to claim 9, wherein said predicted images are written to a prediction table.

11. Apparatus according to claim 10, wherein said processor is arranged to perform said prediction and said transferring of predicted image data each time image data is requested from said storage device.

12. Apparatus according to claim 10, wherein said high speed memory comprises a cache.

13. Apparatus according to claim 9, wherein said data describing each image in said look-ahead map comprises physical storage addresses on said storage device of next image in said clips.

14. Apparatus according to claim 13, wherein said processor is arranged to perform said prediction and said transferring of predicted image data each time image data is requested from said storage device.

15. Apparatus according to claim 13, wherein said high speed memory comprises a cache.

16. Apparatus according to claim 9, wherein said processor is arranged to search for patterns by calculating the number of individual clips in said history table;

using said calculated number to identify an entry in said history table; and addressing history table entries from said identified entry in order to address said look-ahead map to obtain physical storage address of said predicted images.

17. Apparatus according to claim 16, wherein said processor is arranged to perform said prediction and said transferring of predicted image data each time image data is requested from said storage device.

18. Apparatus according to claim 16, wherein said high speed memory comprises a cache.

19. Apparatus according to any of claim 11, wherein said processor is arranged to perform said prediction and said transferring of predicted image data each time image data is requested from said storage device.

20. Apparatus according to claim 19, wherein said high speed memory comprises a cache.

21. Apparatus according to claim 11, wherein said high speed memory comprises a cache.

22. Apparatus according to claim 9, wherein said processor is arranged to perform said prediction and said transferring of predicted image data each time image data is requested from said storage device.

23. Apparatus according to claim 9, wherein said high speed memory comprises a cache.

* * * * *

Disclaimer 6,337,691—James Trainor, Quebec (CA). IMAGE DATA TRANSFER. Patent dated January 8, 2002. Disclaimer filed September 30, 2003, by the assignee, Autodesk Canada, Inc.

Hereby enters this disclaimer to claims 19 and 21, of said patent.

*(Official Gazette, March 2, 2004)*